H. W. WINTER.
MACHINE FOR SETTING HEEL AND SOLE PROTECTORS FOR BOOTS OR SHOES.
APPLICATION FILED NOV. 5, 1898.

1,002,189.

Patented Aug. 29, 1911.

H. W. WINTER.
MACHINE FOR SETTING HEEL AND SOLE PROTECTORS FOR BOOTS OR SHOES.
APPLICATION FILED NOV. 5, 1898.

1,002,189.

Patented Aug. 29, 1911.

H. W. WINTER.
MACHINE FOR SETTING HEEL AND SOLE PROTECTORS FOR BOOTS OR SHOES.
APPLICATION FILED NOV. 5, 1898.

1,002,189.

Patented Aug. 29, 1911.

Witnesses:
Fred S. Greenleaf.
James M. Urquhart.

Inventor,
Henry W. Winter,
By Crosby Gregory
attys.

H. W. WINTER.
MACHINE FOR SETTING HEEL AND SOLE PROTECTORS FOR BOOTS OR SHOES.
APPLICATION FILED NOV. 5, 1898.

1,002,189.

Patented Aug. 29, 1911.

UNITED STATES PATENT OFFICE.

HENRY W. WINTER, OF BOSTON, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

MACHINE FOR SETTING HEEL AND SOLE PROTECTORS FOR BOOTS OR SHOES.

1,002,189.      Specification of Letters Patent.      Patented Aug. 29, 1911.

Application filed November 5, 1898. Serial No. 695,540.

*To all whom it may concern:*

Be it known that I, HENRY W. WINTER, of Boston, county of Suffolk, State of Massachusetts, have invented an Improvement in Machines for Setting Heel and Sole Protectors for Boots or Shoes, of which the following description, in connection with the accompanying drawings, is a specification, like letters on the drawings representing like parts.

This invention has for its object the production of a machine for setting heel or sole protectors for boots or shoes, such protectors being of metal bent or curved into substantially horse-shoe shape in cross-section. Such protectors are driven into the material of the sole or heel in such manner as to leave the exposed or wear-resisting end of the protector substantially flush with the surface of the work, and such protectors are commonly made in two forms. One form of protector may be driven either end foremost into the work, as both ends are alike, while another form of protector has a flattened head end, a retaining shoulder extending around the exterior of the protector between its head and foot, and the foot or opposite end of said protector is beveled. The latter form of protector is preferable, inasmuch as it is held more firmly in the material of the sole or heel by reason of its shape and retaining shoulder, so that it cannot work loose and drop out, and while the machine forming the subject matter of my invention is adapted to set either form of protector, it is particularly adapted for handling and setting protectors of the second form referred to having a head and a foot, as the respective ends of the protector may be termed, with the exterior beveled in one direction. So far as I am aware such protectors in general practice have been set or inserted in the work by hand owing to the difficulty encountered in providing means for presenting such protectors with the foot end foremost to be driven into the work.

The various novel features of construction, arrangement and operation embodied in my invention will be described in detail in the following specification, and particularly pointed out in the claims.

Figure 1 is a right hand side elevation of a machine embodying one form of my invention for setting heel and sole protectors for boots and shoes, the standard being shown as broken out above its base to economize space in the drawings. Fig. $1^a$ is a partial detail in end elevation of the clutch mechanism herein employed. Fig. 4 is an enlarged, transverse, vertical, sectional view of the upper part or head of the apparatus, on the line $x'$—$x'$, Fig. 1, looking toward the left. Fig. $4^a$ is a perspective view of the driver carrier, to be hereinafter described, with a gang of drivers. Fig. $4^b$ is a partial front perspective view of the receiver in the hopper, showing more clearly the elevator slots and tumbling devices for changing the position of the protectors before passing to the upper ends of the raceways. Fig. 5 is an enlarged plan view, partly in section on the line $x^2$—$x^2$, Fig. 2, looking down, and showing the lower ends of the raceways, the transferrer and the actuating means therefor. Fig. $5^a$ is a vertical sectional detail of one of the driver passages in the positioning and pressure plate to be described, taken on the line $x^5$—$x^5$, Fig. 5. Fig. 6 is a longitudinal sectional view on the line $x^3$—$x^3$, Fig. 5, through the transferrer.

In my present invention, as will more fully appear hereinafter, I have made provision for the presentation and simultaneous setting of a plurality of protectors, and the mechanism is adapted to set the protectors for either a "right" or a "left" shoe.

Figures 1, 1A:
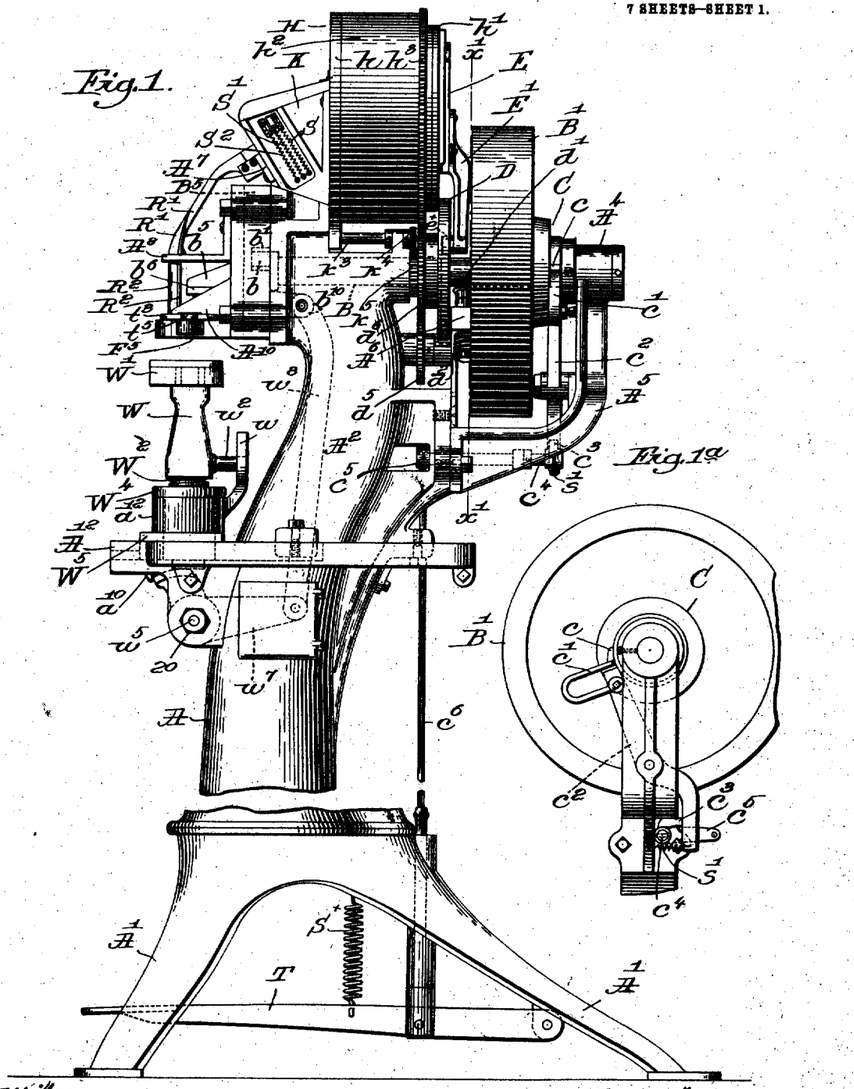
Figure 2:
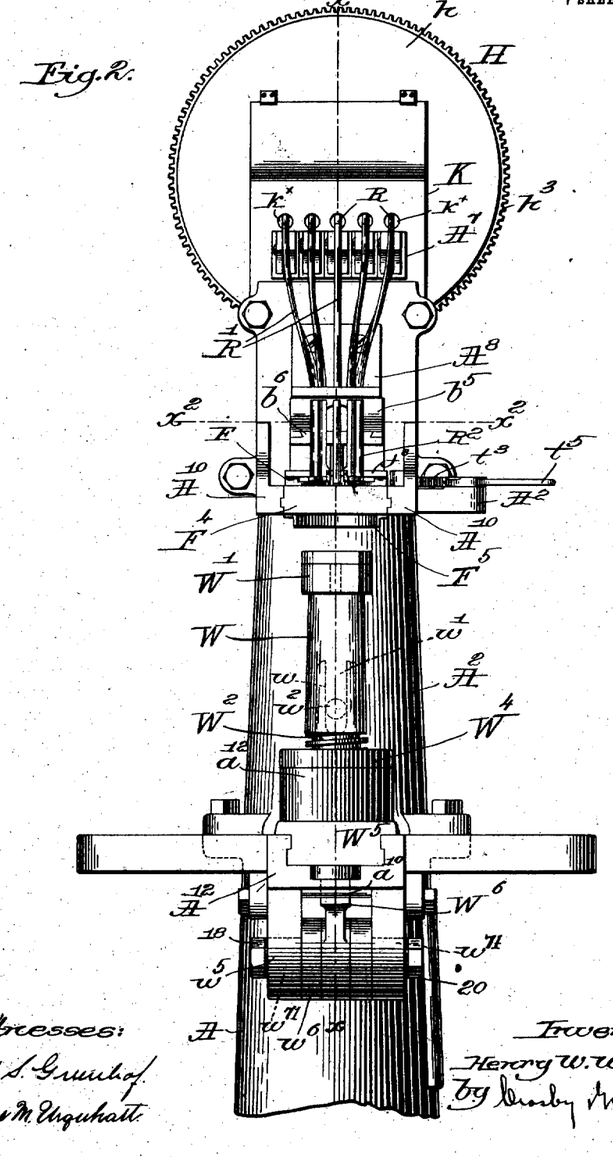
Fig. 2 is a front elevation of the apparatus shown in Fig. 1, somewhat enlarged and with the base omitted.
Figure 3:
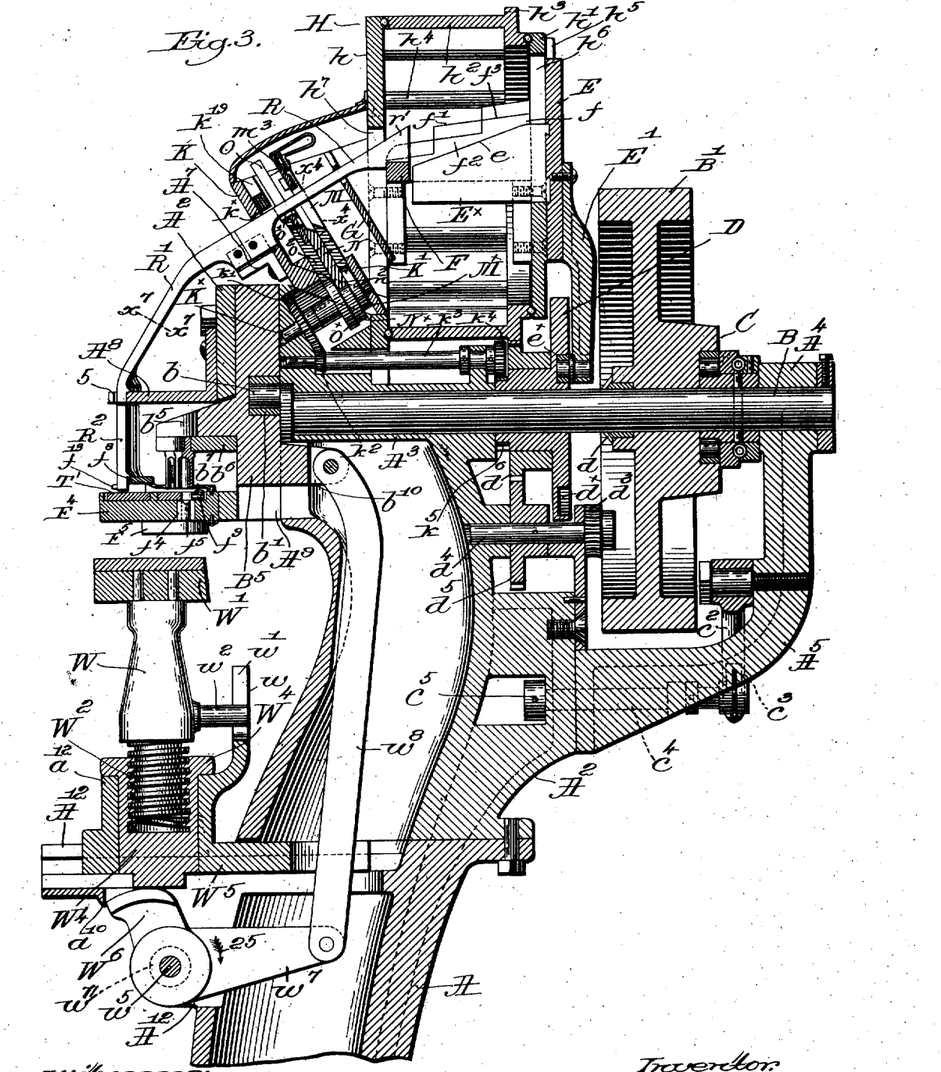
Fig. 3 is a central vertical section of the apparatus taken on the line $x$—$x$, Fig. 2.

Referring to Figs. 1, 2 and 3, I have herein shown the working parts of the machine as mounted on an upright standard or column A of suitable construction, provided, as shown in Fig. 1, with feet A' to form a firm and extended base, the standard being surmounted by a head $A^2$ of suitable shape, to provide bearings for the operative parts. The main shaft B is supported in bearings $A^3$, $A^4$, on the head, and a bracket or arm $A^5$ respectively, said bracket being secured to or forming a part of the head, the shaft B at its forward end having a wrist pin $b$, see Fig. 3, on which is mounted loosely a roll $b'$ for a purpose to be described. A pulley B' is loosely mounted on the shaft and is adapted to be connected therewith at times by any suitable clutch mechanism C, and I have herein illustrated one form of the well known "Horton" clutch. The usual stop lug $c$ is controlled by a detent $c'$ on the upper end of a lever $c^2$, the opposite end of said lever being at times moved by a dog $c^3$ fast on a rock shaft $c^4$, the latter being provided with an arm $c^5$ connected by a link $c^6$ with the treadle T, mounted on the base of the standard and normally elevated by a spring $S^x$, a spring $s'$ attached at one end to the lever $c^2$ maintaining it in engagement with the dog $c^3$. This clutch is adapted to connect the shaft and the loose pulley B', while the shaft makes one revolution, and at the end of the revolution the clutch is released by the engagement of the stop $c$ with the detent $c'$. The pulley B' has fast upon the inner end of its hub a bevel gear $d$ in mesh with a similar gear $d'$ fast on one end of a worm $d^2$, mounted in a bearing $A^6$ on the head, the worm in turn engaging a worm gear $d^3$ on a short shaft $d^4$, mounted to rotate in a bearing in the head and having fast upon it a gear $d^5$ which meshes with a gear $d^6$, secured to or forming part of a cam disk D provided in its outer face with a cam groove $d^x$, shown clearly in Fig. 4.

Figures 4, 4A, 4B:
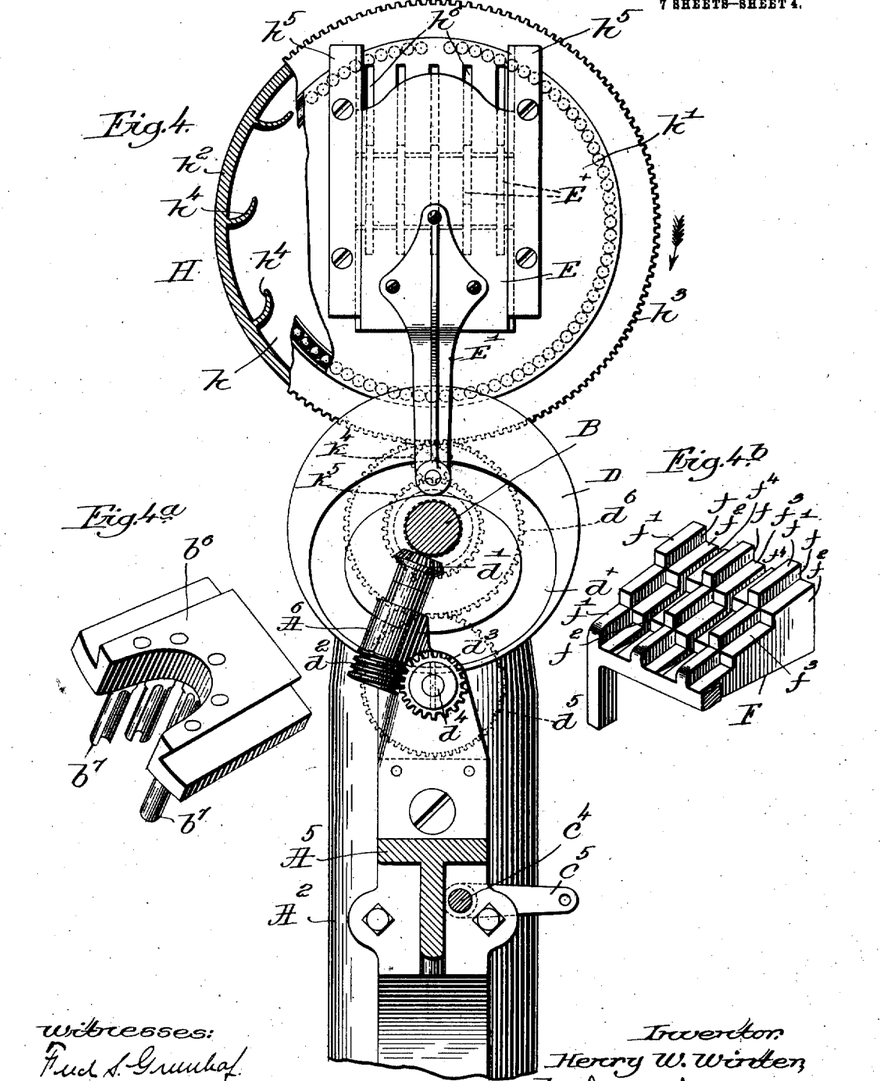

A hopper H is mounted on the upper portion of the head of the machine, said hopper comprising stationary upright ends $h$, $h'$, between which is rotatably mounted, preferably on ball bearings as shown in Fig. 3, a cylindrical body $h^2$ provided with an annular gear $h^3$ in mesh with the gear $d^6$, hereinbefore referred to, the interior of the hopper body $h^2$ being provided with suitable lifters $h^4$, see Fig. 4, substantially parallel to the axis of rotation of the hopper body and adapted to lift the protectors from the lower portion of the hopper and to discharge them onto a suitable receiver or shelf, from which they pass to the elevators to be described, the elevators presenting the protectors to the upper ends of the raceways. The rear end wall $h'$ of the hopper is provided with suitable guides $h^5$, see Fig. 4, for a vertically reciprocable carrier, shown as a plate E having a depending arm E' rigidly secured thereto and provided with a roller or other stud $e^x$, to enter the cam groove $d^x$, rotation of the cam disk D thereby effecting the reciprocation of the carrier E. The end wall $h'$ is provided with a series of vertical slots $h^6$, five of such slots being herein shown to receive a corresponding number of elevators $E^x$, shown as thin plates set on edge and secured to the carrier E in any suitable manner, the elevators extending, as shown in Fig. 3, into the body of the hopper and reciprocating vertically therein by or through the described movement of the carrier E, the upper edges $e$ of the elevators being inclined toward the front of the hopper, as clearly shown in Fig. 3.

Referring now to Figs. 3 and $4^b$, a receiver, shown as a casting of somewhat peculiar shape, is mounted within the hopper, said casting F comprising a series of upright separated walls $f$, alternating with the elevators $E^x$ and arranged quite closely to the sides of the latter, the said walls having their tops stepped as at $f'$ with the treads of the steps, as they may be termed, inclined from the back to the front end wall of the hopper, as best shown in Fig. 3, and below the stepped top of each wall the vertical face of the latter is provided with a second tier or series of steps $f^2$, the tread portions $f^3$ being parallel to the treads of the top, as best shown in Fig. $4^b$, to form a series of recesses slotted at $f^4$, and in which the elevators rise and fall.

The protectors are carried by the lifters $h^4$ upward from the bottom of the hopper, and are discharged upon the walls and into the recesses of the receiver F, and the inclined treads of the steps serve to constantly turn and alter the position of the protectors as they are agitated and lifted from time to time by the elevators, to thereby prevent a number of protectors massing together in one of the recesses and simply rising and falling as a mass with the movements of the elevator.

Some of the protectors which are carried to the treads of the steps slide down the latter and against a guard plate G located in front of an opening $h^7$ in the front wall of the hopper, the guard plate returning the protectors to the bottom of the hopper. This opening $h^7$ in the hopper wall admits the upper ends of a series of raceways R, the latter being formed as thin metal blade-like pieces extended into the hopper on edge, and at their broadened upper ends $r'$ resting on the casting F immediately in front, and closely adjacent the paths of movement of the outer ends of the elevators E$^x$, the lower ends of the upper sections being rigidly secured to a bracket A$^7$ on the head of the machine.

As the elevators rise such of the protectors in the recesses between the walls $f$ of the casting as are in proper position will straddle the elevators and will be lifted thereby, into position to slide from the elevators when the latter are in their uppermost position onto the adjacent ends $r'$ of the raceways, a dwell in the cam groove $d^x$ maintaining the elevators stationary for a short time at the upper end of their strokes.

After the protectors have been delivered to the raceway, they move into position to be acted upon by a selecting device which is arranged to remove from the raceway such protectors as present themselves wrong end foremost, and while the selecting device is operating, a detent acts to hold the series of protectors above it stationary upon the raceway, while at the same time a let-off device is operative to form a stop or wall to prevent the passage beyond it of a protector until the selecting device has been moved into operative position, the relative movement of the detent and let-off being such that one moves out of and into operative position again before the other moves into inoperative position, and vice versa. As will presently appear, the detent is so constructed as to form a guide for and direct the movement of an improperly positioned protector as it is moved from the raceway by the selecting device. The let-off also has an additional function, viz., to clear the raceway of protectors as it moves into operative position, provided the raceway below said let-off should be filled, as shown in Fig. 12.

A box-like chambered or hollow casting K is attached to the front wall of the hopper, the said casting inclosing the opening $h^7$ in said hopper wall, and within and upon this casting I have arranged the selecting detent and let-off devices, the upper sections R of the raceways passing through the casting K to the bracket A$^7$, from which the second sections of raceways R' conduct the protectors still farther on their path toward the drivers.

Figure 8:
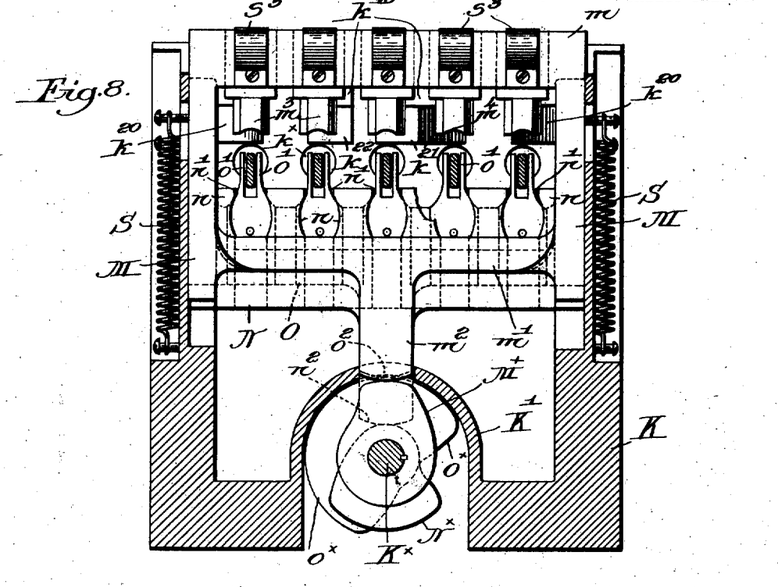
Fig. 8 is an enlarged detail view with certain parts in section in the plane of the line $x^4$—$x^4$, Fig. 3, looking to the left, and showing more clearly the selecting and let-off devices for controlling the passage of the protectors from the hopper to the lower portions of the raceways.
Figure 9:
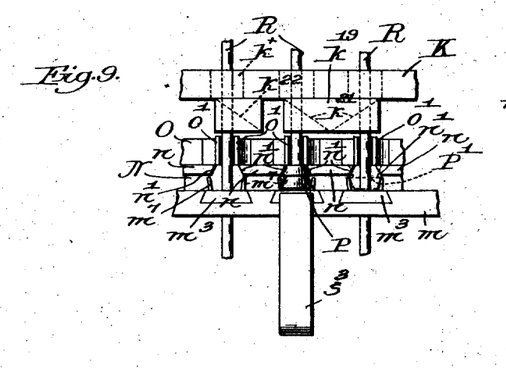
Fig. 9 is a partial top or plan view of a part of the mechanism shown in Fig. 8. Fig. $9^a$ is a perspective detail of one of the detents to be described.
Figure 9A:
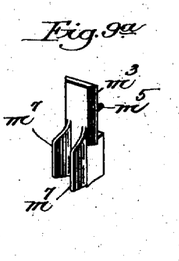

Referring now to Figs. 3 and 8–12 inclusive, the sides of the casting K are grooved to receive three adjacent slide plates M, N, and O, arranged in the order named from rear to front and substantially at right angles to the raceway sections R. The plate M is cut away centrally to leave top and bottom bars $m$, $m'$, respectively, the latter having a depending foot $m^2$ to enter a slot in a boss K$^7$, and engage the periphery of a cam M$^x$ fast on a short shaft K$^x$ mounted in fixed bearings in said boss, the upper bar $m$ being provided with a series of undercut, upright grooves, as shown in Fig. 9, to receive each a sliding detent member $m^3$, shown separately in Fig. 9$^a$, the lower end of the detent being concaved as at $m^4$ to rest upon one of the protectors P when the detent is in operative position, as shown in any one of Figs. 10, 11 and 12. A stud $m^5$ in the back of each detent enters a slot or recess $m^6$ in the top bar $m$, to limit the movement of the detent relative to its carrier bar or support $m$, while a suitable spring $s^3$ fast on said supporting bar rests at its free end on the top of and normally depresses the detent, thus compensating for slight variation in the sizes of the protectors. The series of detents $m^3$ are arranged in their support $m$ above the series of raceways R, as clearly shown in Fig. 8, and in this figure the detents are elevated to permit the free passage of the protectors beneath them. Suitable springs S, fixedly attached at one end to the side walls of the chamber K and at their other end to pins or studs projecting from the frame M, serve to depress said frame and maintain the foot $m^2$ in engagement with the periphery of the controlling cam M$^x$. Immediately in front of and adjacent the plate M, a second plate N is mounted to slide in the casting K, said plate being U-shaped and having a depending foot $n^2$ to travel upon the periphery of a cam N$^x$ fast on the shaft K$^x$, springs S', Fig. 1, depressing said plate and maintaining its foot in engagement with its controlling cam. A series of upturned fingers $n$ are secured to the plate N, the endmost fingers being shown as single in Fig. 8, while the intermediate fingers are made double for convenience in construction, said fingers being beveled at their upper corners as at $n'$, the bevels of two coöperating fingers being opposite and corresponding to the external bevel of the foot or lower end of the protector, as shown in Fig. 9, so that when a protector presents itself with its lower end or foot foremost, the fingers as they rise will pass at each side of the beveled foot, as shown in full lines in Fig. 9, the protector P being therein illustrated as properly positioned to pass down the raceway. If, however, the protector should present itself head end foremost, as shown by dotted lines at P', Fig. 9, the bevel of the protector will be opposite to the beveled corners of the fingers, and as the latter rise the fingers will engage said protector and lift it from the raceway.

Figure 10:
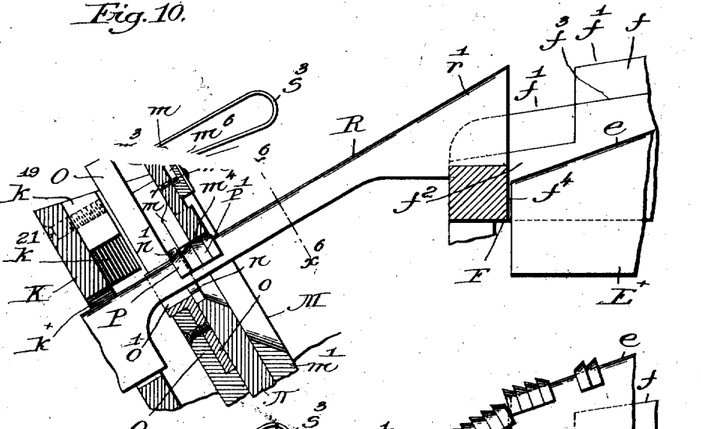
Figs. 10, 11 and 12 are enlarged detail views partially in section to show the operation of the detent, let-off and selecting devices adjacent the hopper.
Figures 11, 13, 14:
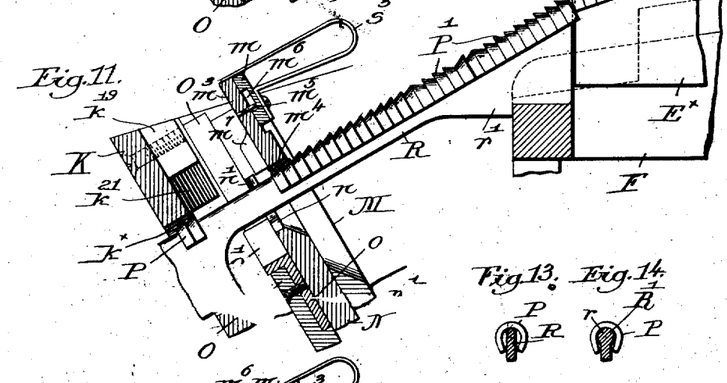
Fig. 13 is a cross sectional view of the raceway, on the line $x^6$—$x^6$, Fig. 10, with a protector thereon.
Fig. 14 is a similar view, taken on the line $x^7$—$x^7$, Fig. 8.
Figure 12:
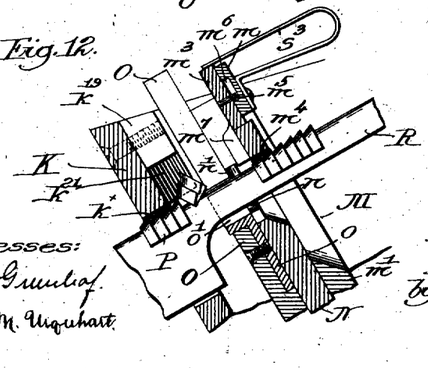

Referring now to Fig. 9$^a$, the detent is shown as provided on its outer face with two wings or lips $m^7$, outwardly beveled on their inner faces and projecting, as shown in Figs. 10, 11 and 12, just back of the path of movement of the fingers $n$. When the fingers which form a selecting device encounter a properly positioned protector, they normally pass at each side thereof as described, but if there should be any slight fin or enlargement of the protector, the fingers would tend to lift or tip it, and to prevent this the wings $m^7$ of the detent, by their engagement with the head of the protector, hold it down against such upward movement of the selecting fingers so that it will not be removed from the raceway, as at P, Fig. 9. On the other hand, when a protector, as P', is improperly positioned, it will be seen, by reference to Fig. 9, that the bevel of the wings $m^7$ then corresponds to the bevel of the foot of the protector, and acts as a guide for the latter when it is lifted from the raceway by the selecting device, and serves to direct it forward toward the front inclined wall of the casting K, from which it travels by gravity back to the hopper.

In Fig. 10 the detent is shown in engagement with an improperly positioned protector P', while the selecting device has moved into operative position and consequently has not disturbed the other of the protectors P which is properly positioned and ready to travel along the raceway as soon as the let-off is withdrawn to permit it.

The let-off mechanism comprises essentially a second U-shaped bar O adapted to slide in the side walls of the casting K and provided with a depending foot $o^2$ to bear against the periphery of a cam $O^x$ fast on the shaft $K^x$, springs $S^2$ connected at their free ends with the plate O serving to depress it and to maintain the foot against the cam. The said plate has attached to its transverse portion a series of upturned lugs $o'$ arranged in pairs, as clearly shown in Figs. 8 and 9, said pairs of lugs being so located relative to the several raceways that when the plate O is raised, the said lugs will slide upward at each side of the raceway and act as a stop to prevent passage of a protector through one of the openings $k^x$ in the front wall of the casting K.

In Figs. 10 and 12, and in Fig. 8, the let-off device is in operative position, while in Fig. 11 it is retracted into inoperative position, so that the lugs $o'$ are below the path of travel of the protectors. The three cams $M^x$, $N^x$, and $O^x$ are of such shape, see Fig. 8, and so set relatively to each other that in the rotation of the shaft $K^x$, supposing the parts are in the position shown in Fig. 10, the endmost and properly positioned protector shown therein will pass down the raceway as soon as the let-off lugs $o'$ are depressed.

In Fig. 11 the let-off for one raceway is shown in inoperative position and the endmost protector has started and is just about to pass through the opening $k^x$ in the front wall of the casting K, while the detent $m^3$ for such raceway still holds stationary the endmost protector of the series thereupon. Further rotation of the shaft $K^x$ operates to move the let-off lugs into operative position and to withdraw the selecting device, and when the latter is in inoperative position the cam $M^x$ operates to raise the detent device and release the series of protectors, so that the endmost one will slide down into position above the path of the selecting device, and as the latter rises, the detents are again lowered into operative position as before. Now, as has been described, the protector which is in the path of the selecting device will be engaged by the latter or not, according to whether said protector is head end or point end foremost. The let-off mechanism has an additional function, viz., to clear the raceway of the down-moving protectors if it should happen that the raceway beyond the said let-off mechanism should be full, and referring to Fig. 12, it is supposed that the lower part of the raceway is so loaded with protectors that the latter have backed up, as it were, into the position shown. Under such circumstances the let-off lugs as they rise will engage that protector which is located on the raceway above them, and will lift and tip it from the raceway, to fall back again into the hopper, a protector being shown in Fig. 12 as tipped and just about to be thrown from the raceway. This function of the let-off mechanism will be called into play whenever the raceway is crowded, and by its action prevents any improper presentation of the protectors to the action of the selecting and let-off devices.

The shaft $K^x$ has fast thereon a bevel gear $k'$ in mesh with the bevel pinion $k^2$, on a shaft $k^3$ provided with a gear $k^4$, which engages and is driven by a ring gear $k^5$ secured to the hub of the cam disk D.

The front wall of the chamber K is shown as provided with deflectors to deflect the protectors laterally from a raceway when they are removed therefrom, either by the selecting device when they are improperly presented, or by the let-off lugs $o'$ when the latter act to strip the raceways. These deflectors are shown as beveled blocks $k^{19}$ secured to the inner face of the front wall above and at one side of the several raceways, the end deflectors $k^{20}$ and one other, as $k^{22}$, being shown single, while the deflector $k^{21}$ is made double, owing to their use with five raceways. Each end deflector turns a protector from its adjacent raceway into the space between such raceway and the next adjacent inner one, while deflector $k^{22}$ turns them into the space between the center raceway and the second one from the left hand end, Fig. 8. The double deflector $k^{21}$ takes care of protectors removed from the central raceway and the one next it on the right, viewing Fig. 8, so that by the use of the deflectors protectors which have been removed from the raceways cannot again fall upon them, but pass from the bottom of the chamber K back into the hopper.

The raceway sections R' are enlarged or beaded along their upper edges as at $r$, Fig. 14, to prevent the protectors from dropping off as they travel along to the vertical or substantially vertical sections $R^2$ of the raceways. The sections R' are secured at their ends to the brackets $A^7$, $A^8$, and of course are in alinement with the upper sections R and also with the upper ends of the lower upright sections $R^2$, the shelf of the bracket $A^8$ having openings 5 therein, see Fig. 3, for the passage of the protectors.

The head $A^2$ is vertically grooved at $A^9$, Fig. 3, to receive a plunger $B^5$ having a transverse groove in its rear face to be entered by the roll $b'$ on the wrist pin of the main shaft B, whereby said plunger will be reciprocated as the shaft rotates, the highest position of the plunger being shown in Fig. 3. An overhanging projecting portion $b^5$ of the plunger has detachably connected thereto as by a dove-tailed groove, see Fig. 2, a driver plate $b^6$ in which are secured a series of depending drivers $b^7$, the plate $b^6$ being made removable so that gangs of differently positioned drivers may be readily applied to the machine. The shape of the drivers is best shown in Fig. $4^a$, said drivers corresponding substantially in shape and size to the heads of the protectors, the path of movement of the drivers being herein shown as at the rear of the lower ends of the raceway sections $R^2$.

The head $A^2$ is extended forwardly to form arms $A^{10}$ below and at the sides of the drivers, and grooved on their inner faces, as shown in Fig. 2, to receive a positioning or pressure block $F^4$ which also forms the fixed rest for the work during the insertion of the protectors, and for convenience in positioning the boot or shoe when the protectors are to be inserted in the heel thereof, I have herein shown a curved guide plate $F^5$ attached to the underside of the block $F^4$ to receive and position the heel. The block $F^4$ has a series of driver passages $f^4$ therein, see Figs. 3 and $5^a$, of such shape and size as to permit the passage therethrough of the protectors as they are being driven into the work, each passage having a central rib $f^5$ therein to guide and position the protector while being driven. The top of the block $F^4$ is recessed as at $f^6$, Figs. 6 and 7, to receive a transferrer shown as a peripherally toothed plate T' mounted to rotate on a boss $f^7$, projecting from the block $F^4$, the teeth $t$ of the transferrer engaging the teeth of a gear $t'$ mounted on a screw stud 6 screwed into a part of the head $A^2$, as shown, and secured to or forming part of the gear $t'$ is a pinion $t^2$, which in turn meshes with a segmental gear $t^3$ fulcrumed at $t^4$ on the head and provided with an actuating handle $t^5$.

By swinging the handle in the direction of the arrow 10, Fig. 5, the transferrer will be rotated in the same direction, into position to receive protectors from the raceways to be subsequently driven into a "left" boot or shoe when the transferrer is restored to midway position, as shown in said Fig. 5. If the handle is swung in the direction of the arrow 12 into the position shown in Fig. 7, the transferrer is then ready to receive protectors to be driven into a "right" boot or shoe.

Figures 5, 5A, 6:
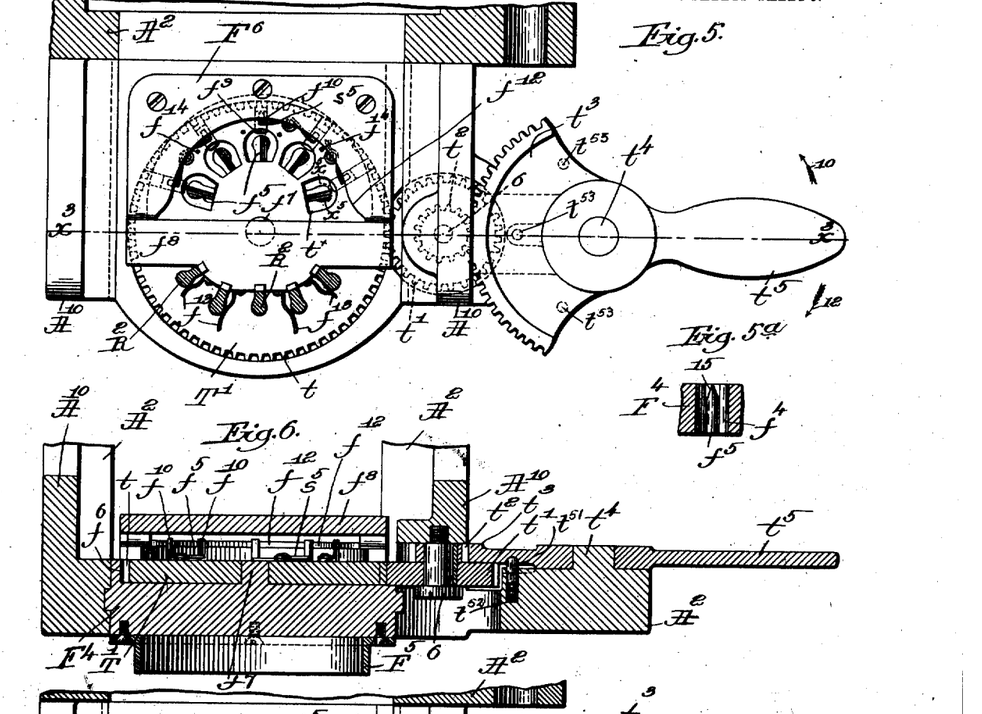

For the purpose of yieldingly detaining the handle and transferrer in each of the three positions thereof a detent-device is provided, which, as shown in Fig. 6, comprises a pin $t^{51}$ seated in a hole bored in head $A^2$ beneath segmental gear $t^3$, and acted upon by an expanding spiral spring $t^{52}$ that is compressed in said hole beneath the pin, a series of holes $t^{53}$, $t^{53}$, $t^{53}$, being made in the under side of the segment-gear to receive the acting end of the said pin. These holes last-mentioned are so disposed that in each of the three positions of the parts one of the holes is presented in position to receive the acting end of the detent pin. Thereby the handle and transferrer are held from accidental turning movement. The acting end of the pin is rounded so that upon the application of sufficient power to the handle tending to swing the same the pin will be forced downward into its hole, permitting the segment-gear to be turned.

A plate $F^6$ is attached to the top of the block $F^4$, and near its outer end is raised as at $f^8$ to form a suport for the lower ends of the raceway sections $R^2$, the latter approaching within a short distance of the exposed upper face of the transferrer T'. The position of these raceways is shown in Fig. 5, wherein they are indicated in section on the line $x^2$—$x^2$ see Fig. 2. Inasmuch as the back end of a heel is not usually a true circle, the raceways $R^2$ are not arranged all on the arc of a circle, as will be apparent from Fig. 5, the central raceway being set in from the arc on which the other four raceways are placed, the center raceway being called into play whether the shoe be a right or a left.

Figure 7:
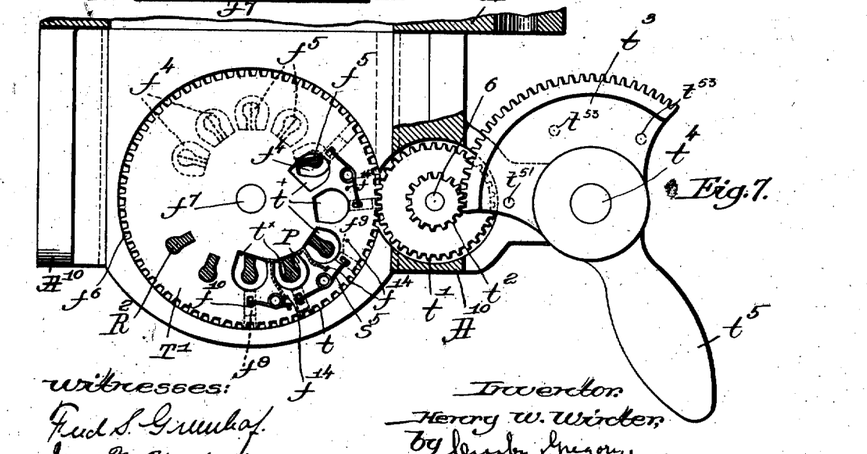
Fig. 7 is a view similar to Fig. 5, but with the transferrer in position for the descent of the drivers for a boot or shoe for the right foot, to set protectors in the heel thereof.

As shown in full lines Fig. 7, the transferrer T' has five holes $t^x$ therein, shaped to receive protectors as they pass from the lower ends of the raceways, the protectors being held in the holes or pockets, during the partial movement of the transferrer by the top of the block $F^4$, but to keep protectors in place until the transferrer has properly positioned them above the driver passages $f^4$ in the said block, I have provided a series of detents shown as slides $f^9$ mounted in the transferrer and movable toward and from the pockets $t^x$, and normally held in retracted position by suitable springs $s^5$, the springs resting against upturned lugs $f^{10}$ on the detents. The plate $F^6$ is provided with a cam shelf $f^{12}$ shaped to act upon the lugs $f^{10}$ as the transferrer is moved from loading into driving position, to move the detents one after another into engagement with the protector in the adjacent pocket, and to maintain by slight frictional pressure such protector pressed against the inner pocket wall until the descent of the drivers carries the protectors from the pockets through the driver passages and into the work. Commonly three protectors are driven into a heel and when loading for a "right" shoe, as in Fig. 7, the three foremost pockets of the transferrer in Fig. 7 such being at the right hand side in Fig. 5 will be located beneath and to receive each a protector from the three right hand raceways, viewing Fig. 2 or Fig. 7.

The support $f^8$ is provided with spring fingers $f^{13}$ located adjacent and at the inner side of the two raceways at each side of the center, said fingers serving to hold the endmost protectors on the raceways after the transferrer has begun its movement from loading into driving position. When the transferrer moves into loading position, pins $f^{14}$ are moved into engagement with the spring fingers $f^{13}$ adjacent the two endmost raceways which are to deliver protectors, and such fingers are moved away from the protectors held by them, to permit free passage of the former down the raceways and into the pockets of the transferrer.

Inasmuch as the central raceway is to deliver a protector each time whether the shoe be a right or a left, and because of the location of said raceway relative to the pockets of the transferrer, it is unnecessary to provide it with a stop finger because one or the other end pocket of the series in the transferrer will always be brought beneath the central raceway when the transferrer is in loading position.

In Fig. 7 the position of the pocket $t^x$ for driving is shown in dotted lines, and in Fig. 5 the transferrer is shown in full lines in driving position, the guides $f^5$ in the driver passages being also shown through the open pockets, the upper ends of said guides being preferably beveled as at 15, Fig. 5ª, to facilitate the entrance of a protector into the driver passage.

It will be obvious from the foregoing description that the protectors remain in the transferrer from the time they pass thereto from the raceways until they are positively pushed out of the transferrer by the impact of the descending drivers, and as soon as they thus leave the transferrer, they pass immediately through the driver passages and into the work.

The work support is shown as a spindle W having attached to its upper end a suitably shaped block W', to enter the heel end of and support the boot or shoe, the lower end of the spindle being threaded as at $W^2$, Fig. 3, to enter a threaded plunger $W^4$, vertically movable in a bearing $a^{12}$ secured to or forming part of a slide $W^5$ mounted in a suitable guide $A^{12}$, attached to or forming a part of the standard A, the slide having an upturned arm $w$ at the rear of the spindle and slotted at $w'$ to receive a stud or pin $w^2$ projected rearwardly from the spindle to prevent rotation of the latter when the plunger $W^4$ is reciprocated. The lower end of the plunger projects beneath the slide $W^5$, and rests upon a cam $W^6$ loosely mounted on a shaft $w^5$ having its bearings in the two parts of the guide $A^{12}$, as shown in Fig. 2, said shaft being extended through the disk-like hubs $w^6$ of two arms $w^7$, connected by a suitable link $w^8$ with an ear $b^{10}$ on the driver actuating plunger $B^5$. The hub of the cam $W^6$ is as shown in Fig. 2 located between the disk-like hubs $w^6$, and the latter are provided with sleeve-like extensions $w^{71}$, which project through and slightly beyond the bearing portions of the guide $A^{12}$. The shaft $w^5$ is provided with a head as 18 at one end, and at its other end is threaded to receive a nut 20, so that by tightening the nut 20, the pressure of the disk hubs $w^6$ upon the hub of the cam $W^6$ may be varied according to circumstances.

Now, when the driver plunger $B^5$ descends, the disk hubs $w^6$ will be turned in the direction of the arrow 25, Fig. 3, and by a frictional engagement with the cam will rock the latter to act upon and elevate the plunger $W^4$, and thereby raise the work toward the fixed heel support or pressure block $F^4$, and this relative movement of the work support and pressure block will continue until the heel has been compressed to a predetermined point, after which the continued descent of the driver plunger $B^5$ will operate only to still further rock the arms $w^7$ and their disk hubs $w^6$. When the driver plunger rises the disk hubs will, by their frictional engagement with the cam $W^6$, move the latter in the opposite direction, to permit the descent of the plunger $W^4$ until the cam strikes a fixed stop $a^{10}$ on the guide $A^{12}$. By varying the friction between the lifting cam $W^6$ and its actuating devices, the amount of pressure to which the heel is to be subjected may be varied, and after the desired pressure is attained the heel may be maintained under such pressure while the protectors are driven thereinto. The height and density of the heel both operate to determine the point at which the cam W⁶ will cease to elevate the spindle W. Variations in the heights of heels are provided for by adjusting the spindle W up or down in its plunger by means of the screw threaded socket therein.

Several raceways herein shown are made in sections principally for convenience in construction and adjustment, and it will be obvious that said raceways may be made continuous from one to the other end thereof. However, by making the raceways or certain thereof in sections, and particularly the lower ends thereof, I am enabled to readily use different gangs or numbers of raceways without dismantling the entire length of the raceway. So too, while I have shown a plurality of raceways, and have devised the machine to set a plurality of protectors simultaneously, it will be obvious that one protector at a time may be set by simply throwing out of operation all but one of the raceways, or indeed by merely leading one raceway into the hopper.

I have herein shown and particularly described an operative machine embodying one form of my invention without attempting to illustrate or describe all of the changes and variations which may be made in the construction and arrangement of parts, and my invention is not restricted to the precise construction and arrangement of parts herein shown and described.

Having described my invention, what I claim and desire to secure by Letters Patent, is:—

1. In a machine for setting heel or sole protectors, a driver, a raceway, a transferrer to deliver the protectors one at a time from the raceway into the path of the driver, a block having a driver passage therein to receive from the transferrer the protector to be driven, and a rigid guide fixed within said passage and beveled at its upper end, to enter and position the protector while it is being driven.

2. In a machine for setting heel or sole protectors, a driver, a race-way, a movable transferrer having an open-ended pocket therein to receive a protector from the end of the race-way and transfer it into the driver path, a normally inoperative detent on the transferrer, a block below said transferrer and having a driver passage therein to receive the protector from the transferrer, and means to move the detent into engagement with the protector before the transferrer pocket is brought into position over the driver passage, to thereby hold the protector until moved out of the pocket by the driver.

3. In a machine for setting heel or sole protectors, a driver, a race-way, a movable transferrer having an open-ended pocket therein to receive a protector from the end of the race-way and transfer it into the driver path, a normally inoperative detent on the transferrer, a block below said transferrer and having a driver passage therein to receive the protector from the transferrer, a fixed guide in said passage to enter and positively position the protector while being driven, and means to move the detent into engagement with the protector before the latter is brought into the driver path.

4. In a machine for setting heel and sole protectors, a plurality of raceways, a movable transferrer to deliver the protectors one at a time from each raceway into driving position, detents on said transferrer to engage and hold the protectors until moved from the transferrer by the drivers, a gang of drivers, a block having a series of driver passages to receive from the transferrer the several protectors to be driven simultaneously, and means to enter and positively position the protectors as they are moved by the drivers through the driver passages and into the work.

5. In a machine for setting heel and sole protectors, a series of raceways, a gang of reciprocating drivers, a block having a group of driver passages therein; a transferrer movable above said block and having a series of open-ended pockets therein corresponding in number to the driver passages and raceways, means to bring said transferrer into position to receive protectors from a sub-group of the raceways, beginning from either end of the series thereof, for a "right" or a "left" heel or sole, and to thereafter move the transferrer to present the protectors collectively above corresponding driver passages, and means to guide the protectors as they are being driven into the work.

6. In a machine for setting heel and sole protectors, a series of raceways, a gang of reciprocating drivers, a block having the same number of driver passages therein, a transferrer movable above said block and having a plurality of open-ended pockets corresponding in number to the driver passages, means to move the transferrer to bring some of its pockets, starting from either end of the group, beneath the raceways to receive protectors singly therefrom and to thereafter deliver said protectors collectively to corresponding driver passages, for "right" or "left" heels or soles, and means to retain the protectors on the transferrer until moved into the driver passages by the drivers.

7. In a machine for setting sole and heel protectors, a series of raceways, a gang of drivers at one side of the delivery ends of the raceways, a block having a corresponding number of driver passages therein, a movable transferrer interposed between the block and the ends of the raceways, to receive the protectors singly from each raceway and deliver them collectively above the driver passages, a detent for each raceway, to engage and hold the endmost protector thereon, and means to automatically release the detents when said transferrer is in loading position to receive the protectors from the raceways.

8. In a machine for setting sole and heel protectors, an odd number of raceways having their delivery ends arranged in a curve with the side raceways symmetrically disposed relative to the center one, a corresponding number of drivers arranged in like manner, a block having a coöperating series of driver passages therein, a circularly movable transferrer mounted on said block beneath the raceways and provided with a corresponding number of pockets in like arrangement, means to move said transferrer into loading position to receive single protectors from the central and either side group of raceways, for "right" or "left" heels or soles, and to thereafter move the transferrer into position to deliver such protectors collectively to corresponding driver passages, and guides to guide and position the protectors as they are driven into the work.

9. A machine for setting heel and sole protectors, provided with a bi-lateral series of driver-passages to guide the protectors while being driven into the work, a gang of drivers corresponding in number and arrangement to the said driver-passages, and means to selectively present protectors to a uni-lateral group of the said driver-passages, whereby to provide for driving into "right" and "left" heels and soles, respectively.

10. A machine for setting heel and sole protectors provided with a series of drivers, a removable block having driver-passages therein to guide the protectors while being driven into the work, a corresponding number of raceways delivery-sections mounted on the said block and removable therewith, a hopper, raceways leading therefrom to the said delivery-sections, and a transferrer adjustable to present protectors to a selected group of the driver-passages.

11. In a machine for setting heel and sole protectors, in combination, a gang of drivers, means to guide protectors while being driven, a series of supply-raceways, and a transferrer to transfer protectors from the said supply-raceways into position to be driven, adjustable to change the location of the group of protectors to be driven simultaneously, and the number of protectors comprised in such group.

12. In a machine for setting heel and sole protectors, in combination, a gang of drivers, and manually operated means to selectively feed protectors into position to be driven by a group of the drivers at either end of the said gang as desired.

13. In a machine of the class described, a hopper having fixed end walls and a rotatable body, to receive horseshoe-shaped protectors in bulk, a receiver therein provided with a longitudinally slotted recess or trough formed by side walls having inclined, non-continuous tops, a raceway having a blade-like end entering the hopper adjacent and in front of the recess, a reciprocating elevator between the walls of the receiver, to lift such protectors as may straddle it and deliver them to the raceway, the upper edge of the elevator being inclined toward the raceway end, whereby the protectors may slide upon the latter from the elevator when said elevator is in its lifted position, and means upon the interior of the hopper body to throw the protectors upon the receiver.

14. In a machine of the class described, a receiver comprising upright, separated walls having inclined, non-continuous tops, an elevator reciprocating between said walls and adapted to be straddled by properly positioned protectors in the recess formed by the said walls, a raceway having its end in front of and adjacent the path of the elevator, to receive therefrom straddling protector when said raceway and elevator are in alinement, and means to deliver protectors to the receiver, the tops of the walls serving to turn and alter the position of the loose or non-straddling protectors as they are lifted and agitated by the reciprocation of the elevator.

15. In a machine of the class described, a hopper having fixed ends and a rotatable body provided upon its interior with means to lift protectors from the lower part of the hopper, a raceway having a blade-like end extended into the hopper, a reciprocating elevator within the hopper and movable into and out of alinement with the end of the raceway, to deliver thereto such protectors as straddle the elevator, a fixed receiver within the hopper and upon which the protectors fall, said receiver having a recess in which the elevator moves, formed by side walls having stepped and inclined upper edges, to turn and alter the position of the protectors in the recess as they are agitated and lifted by the elevator.

16. In a machine of the class described, a receiver comprising upright, separated walls having inclined, stepped tops, arranged in double tiers with the inclined portions of the inner tiers below those of the outer tiers, an elevator having an inclined upper edge, reciprocating in the recess or trough formed by the walls and adapted to be straddled by properly positioned protectors therein, a raceway having its end in front of and adjacent the path of the elevator, to receive protectors therefrom when said elevator and raceway are in alinement, and means to deliver protectors to the receiver, the stepped tops of the walls turning and altering the position of the loose or non-straddling protectors as they are lifted and agitated by the reciprocation of the elevator.

17. In a machine of the class described, a hopper having fixed ends and a rotatable body provided upon its interior with means to lift protectors from the lower part of the hopper, a raceway having a blade-like end extended into the hopper, a reciprocating elevator within the hopper and movable into and out of alinement with the end of the raceway, to deliver thereto such protectors as straddle the elevator, a fixed receiver within the hopper and upon which the protectors fall, said receiver having a recess in which the elevator moves, formed by side walls having non-continuous tops inclined toward the front of the hopper, to turn and alter the position of non-straddling protectors in the recess as they are agitated and lifted by the elevator, and an inclined guard plate below the raceway, to return to the hopper any protectors which slide down the tops of the walls of the receiver.

18. In a machine of the class described, a blade-like raceway to receive upon it headed horse-shoe shaped protectors, a selecting device to engage and remove such protectors as present themselves wrong end foremost, a detent, and a let-off, arranged respectively above and below the selecting device, and operating devices for said selecting device, detent, and let-off, the let-off preventing the passage of a protector while the selecting device is operative, the detent at such time holding stationary the protectors on the raceway above the selecting device.

19. In a machine of the class described, a blade-like raceway to receive and direct horse-shoe shaped protectors beveled externally in one direction, a let-off intermittingly movable into position to form a stop for the endmost protector of the series, a selecting device, including fingers to move transversely to the raceway at opposite sides thereof and beveled to correspond to the bevel of a properly presented protector while held by the let-off, said fingers engaging and removing from the raceway an improperly presented protector, a detent to engage and hold the protector next above the selecting device when the latter and the let-off are in position to permit the passage of a protector along the raceway and operating devices for the said let-off, selecting-device, and detent.

20. In a machine of the class described, a blade-like raceway to receive upon it headed horse-shoe shaped protectors, a let-off to move intermittingly into position to stop the passage of a protector along the raceway, a selecting device to engage and remove from the raceway a protector presented wrong end foremost while stopped by the let-off, a detent to engage the protector next beyond the selecting device during the operation of the latter, and means carried by the detent to prevent derangement of a properly positioned protector on the raceway during the operation of the selecting device and operating devices for the said let-off, selecting-device, and detent.

21. In a machine of the class described, a blade-like raceway to receive upon it headed horse-shoe shaped protectors, let-off mechanism, including a pair of upturned lugs movable into the path of a protector at each side of the raceway, to form a temporary stop, a selecting device to operate while a protector is thus stopped and to engage and remove it from the raceway if presented wrong end foremost, a detent to engage the protector next beyond the selecting device and hold it stationary during the operation thereof, means to prevent tipping or accidental displacement of a properly presented protector by the selecting device and operating devices for the said let-off mechanism, selecting-device, and detent.

22. In a machine of the class described, a blade-like raceway to receive upon it headed horse-shoe shaped protectors, a selecting device to engage and remove such protectors as present themselves wrong end foremost, a detent, a let-off, arranged respectively above and below the selecting device and actuating devices for said selecting device, detent, and let-off, operating said let-off to stop a protector during the operative movement of the selecting device, and moving the let-off out of and into operative position before the detent is moved into inoperative position, and vice versa.

23. In a machine of the class described, a blade-like raceway to receive upon it headed horse-shoe shaped protectors, a selecting device to engage and remove such protectors as present themselves wrong end foremost, let-off means, including a pair of upturned lugs movable into the path of the protector at each side of the raceway, to form a temporary stop for the protector during operative movement of the selecting device, the tops of said lugs also serving to strip protectors singly from the raceway when the latter is fully loaded beyond the let-off means and operating devices for the said selecting device and let-off means.

24. In a machine for setting headed horse-shoe shaped protectors, a hopper to receive protectors in bulk, a plurality of raceways, means to lift protectors and cause them to straddle the raceways, a plurality of yielding detents to intermittingly act upon the protectors and retain stationary on each raceway the protectors between the detents and hopper, let-off means to move into the paths of and form temporary stops for a protector on each raceway during operative movement of a coöperating selecting device, selecting devices to engage and remove from the raceways such protectors as are presented wrong end foremost while stopped by the let-off mechanism and operating devices for the said detents, let-off means, and selecting-devices.

25. In a machine for setting headed horseshoe shaped protectors, a plurality of raceways, selecting devices to engage and remove from the raceways such protectors as are presented wrong end foremost, let-off mechanism to temporarily stop a protector on each raceway during operative movement of the selecting devices, and detents to control the protectors on the raceways above said devices, combined with actuating means for said selecting devices, let-off mechanism, and detents, operating devices to move the let-off mechanism out of and into operative position before the detents move into inoperative position, and vice versa, and to move the selecting devices into inoperative position while the detents are inoperative and the let-off mechanism is in position to stop the protectors.

26. In a machine of the class described, a plurality of raceways, a casing formed with a chamber through which the said raceways pass, selecting devices to engage and remove protectors presented thereto wrong end foremost, detent devices, and let-off means arranged respectively above and below the selecting devices and all located within the chamber, the let-off means stopping protectors during operative movement of the selecting devices and operating devices for the said selecting devices, detent devices, and let-off means and deflectors on the front wall of the chamber above the several raceways, to engage protectors removed from the raceways and deflect them to one side, to fall to the bottom of the chamber.

27. In a machine of the class described, in combination, a raceway, selecting devices to engage and remove from the said raceway such protectors as are presented wrong end foremost thereon, and means to control the travel of the protectors past the said selecting devices.

28. In a machine of the class described, in combination, a raceway, selecting devices to engage and remove from the said raceway such protectors as are presented wrong way foremost thereon, means to control the travel of the protectors past the said selecting devices, and means for stripping protectors singly from the raceway when the latter is fully loaded beyond the said selecting devices.

29. In a machine of the class described, in combination, a receptacle for protectors, a raceway to receive headed protectors and conduct the same toward the driving point in the machine, a selecting device to remove from the raceway a protector occupying a position wrong end foremost in connection with the raceway, driving devices, and devices for feeding protectors successively from the raceway to the driving devices.

30. In combination, a driver, means to actuate the driver, a fixed support, a movable work-support, a cam to move said movable work-support to compress the work against the fixed work-support, and means connecting the driver with said cam to actuate the said cam to effect such compression, the said means having a frictional slip-coupling adapted to give when the required degree of compression is secured.

31. A machine of the class described provided with a gang of drivers, a corresponding number of driver-passages arranged in a curved series and respectively provided with guides engaging with the protectors to insure radiating positions of the latter in being driven, and means for supplying protectors to the said driver-passages.

32. A machine of the class described provided with a gang of drivers, a corresponding number of driver-passages arranged in a curved series and respectively provided with guides engaging with the protectors to insure radiating positions of the latter in being driven, protector-feeding devices, and a transferrer for transferring to the driving positions protectors supplied by the said feeding devices.

33. A machine of the class described comprising, essentially, a plurality of blade-like raceways, means for supplying horseshoe shaped protectors to the said raceways, a plurality of drivers, a plurality of driver-passages having inside guides to determine the positions of the protectors in being driven and means for selectively delivering the protectors to a predetermined group of driver-passages.

34. In a protector-setting machine, the combination with a plurality of drivers comprising a bi-lateral series, of devices for conveying protectors to said drivers including a corresponding series of raceways and means to supply protectors to a selected uni-lateral group of the said raceways.

In testimony whereof, I have signed my name to this specification, in the presence of two subscribing witnesses.

HENRY W. WINTER.

Witnesses:
JOHN C. EDWARDS,
AUGUSTA E. DEAN.

Copies of this patent may be obtained for five cents each, by addressing the "Commissioner of Patents, Washington, D. C."

It is hereby certified that in Letters Patent No. 1,002,189, granted August 29, 1911, upon the application of Henry W. Winter, of Boston, Massachusetts, for an improvement in "Machines for Setting Heel and Sole Protectors for Boots and Shoes," errors appear in the printed specification requiring correction as follows: Page 10, line 17, for the word "means" read *devices;* line 19, strike out the word "devices," and same line, before the word "operating," strike out the comma; same page, line 73, for the word "support" read *work-support;* and that the said Letters Patent should be read with these corrections therein that the same may conform to the record of the case in the Patent Office.

Signed and sealed this 10th day of October, A. D., 1911.

[SEAL.]

E. B. MOORE,

*Commissioner of Patents.*